July 1, 1930.    A. FEINBERG    1,769,777

HÆMOGLOBIN CHART

Filed April 21, 1928

Inventor:
Alfred Feinberg
By his Attorney

Patented July 1, 1930

1,769,777

UNITED STATES PATENT OFFICE

ALFRED FEINBERG, OF NEW YORK, N. Y., ASSIGNOR TO THE EQUITY PRESS, INC., OF NEW YORK, N. Y., A CORPORATION OF NEW YORK

HÆMOGLOBIN CHART

Application filed April 21, 1928. Serial No. 271,728.

This invention relates to blood testing apparatus and with respect to its more specific features to an apparatus wherewith the percentage strength of the blood in hæmoglobin may be estimated in a visual manner as by comparison of a blood sample with different test colors, the different test colors being indicative of known different percentages of hæmoglobin in a blood sample of corresponding color.

One of the objects of the invention is the provision of a practical apparatus for testing blood for hæmoglobin, which apparatus is of simple construction and is adapted for making a great number of different tests even when made of relatively small size.

Another object is the provision of an efficient apparatus for the purpose, which apparatus is self contained and by means of which the test is quickly performed in an accurate manner.

Another object is the provision of such an apparatus in which the color scale, or color chart automatically, so to speak, is maintained in the most effective color comparable relation to the part thereof which carries the blood sample, or blood stain.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
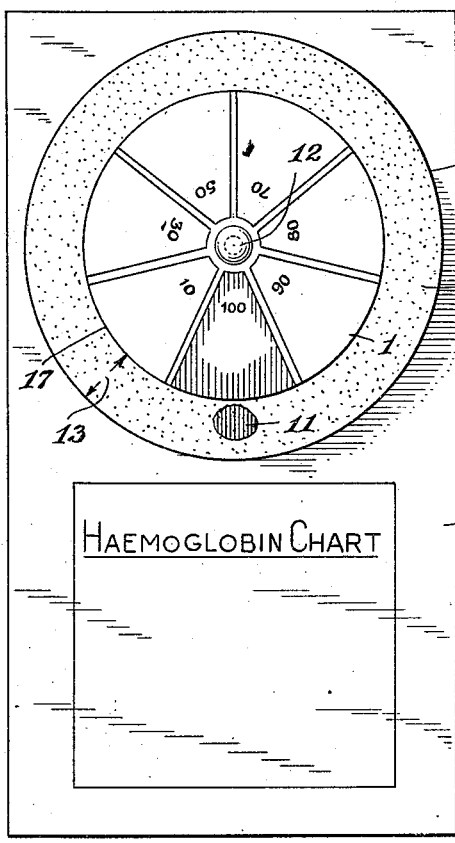
Fig. 1 is a plan view of an apparatus embodying the invention.
Figure 2:
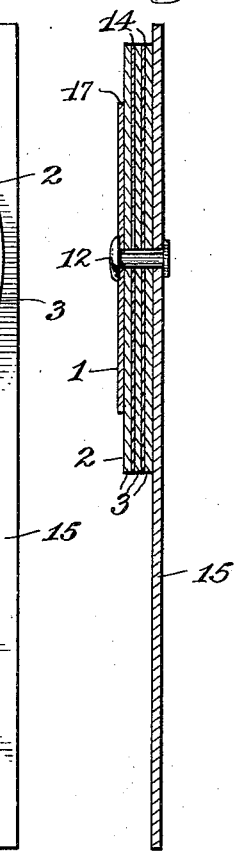
Fig. 2 is a central vertical section of Fig. 1.
Figure 3:
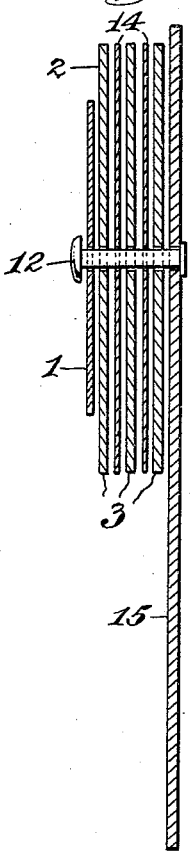
Fig. 3 is a like view of the apparatus, but with the carrier leaves and color chart spaced from each other for clearer disclosure of the different parts.
Figure 4:
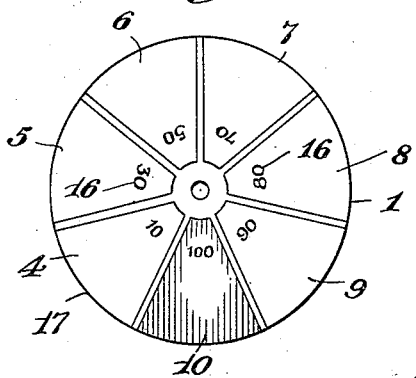
Fig. 4 is a plan view of the color chart.

Referring now more specifically to the drawing, the numeral 1 indicates the color chart, or color scale, and the numeral 2 generally indicates the stain carrier. The stain carrier may consist of one or several carrier leaves. In the present embodiment the stain carrier is composed of a plurality of stain carrier leaves, each of which is indicated by the numeral 3, the leaves 3 being in superposed relation to each other so as to form a pack of carrier leaves. The stain carrier leaves may be of paper, and such paper should have good blood absorbent quality and is preferably dead white. A good quality filter paper would serve although other blood absorbent sheet material may be used.

The color chart 1 is provided with a line of test colors 4, 5, 6, 7, 8, 9 and 10, these colors respectively corresponding in color to blood stains from blood having different known percentages of hæmoglobin content. For instance, seven different test colors are found in the chart, the color 10 indicating that a blood stain corresponding in color thereto has a normal or 100% hæmoglobin content. Similarly the color 9 indicates hæmoglobin content of 90%; the color 4 indicates content of 10%, and so on.

In the present embodiment the chart 1 is circular, and the line of test colors extends peripherally of the chart, each color coming to the outer edge of the chart. By arranging the colors in this circular series it is possible to make the chart of relatively small diameter so that all the colors are viewable together and simultaneously even when the observer's eyes are but a short distance from the chart. By thus viewing the test colors together and all at once, shade and color differences between them are better defined for the observer. Also the sample blood stain on the carrier will be close to the edge of the chart and viewable simultaneously with the test colors, enabling the observer quickly to compare the stain with the chart with better appreciation of minute difference in shade or color. By making each test color a sector of the color chart, each is nevertheless of considerable area so that color comparison is facilitated, notwithstanding the chart may be small, as explained.

The color chart and the stain carrier are shiftable relative to each other serially of the line of test colors, so that a blood stain on the carrier, for instance as indicated at 11, may be disposed directly opposite any of the colors of the chart. As illustrated the color chart 1 is in superposed relation to the stain carrier 2, the two being thus assembled for relative shift. Preferably the shift is a rotative one in a plane parallel to that of the leaves of the carrier. To this end the color chart and carrier leaves are connected by a pin or pivot 12 which passes through the centre of the color chart and of the carrier leaves, the connection thus lying within the edges of the chart and leaves, leaving the edges free to be grasped for manipulation and turning. If desired, the chart alone may be the shiftable element, the carrier leaves being restrained from shifting.

The relation of the chart 1 and the stain carrier 2 is such that during the serial shifting therebetween the stain carrier is exposed and is retained in stain comparing relation to the chart. In the present embodiment these results are secured by having the outer edge of the color chart lie within the outer margin of the pack of carrier leaves, so that the stain-receiving margin 13 of the leaves projects a considerable distance outwardly from the edge of the chart, and is visible alongside the chart at all points of the periphery of the latter. In this wise the size of margin 13 may be selected as desired, without interfering with the operation or position of the chart 1.

As hereinbefore explained, the carrier is preferably composed of a pack of relatively superposed carrier leaves 3, each adapted to receive the stain of the blood sample to be tested. The color chart 1 may rest on the upper carrier leaf 3 so as to be supported by the pack and so as to expose the marginal face 13 of the upper carrier leaf. When the upper carrier leaf has been stained and utilized, it may readily be detached from the pack, as by being torn from the pin 12, thus exposing the next underlying carrier leaf. By using a suitable connection 12, as for instance a smooth pin, or the like, the chart 1 may move or be pressed into contact with the upper face of said next underlying leaf of the pack and thus automatically, as it were, come to comparison position relative to said underlying carrier leaf.

In the present embodiment stain stops are interposed between adjacent of the carrier leaves 3 to prevent staining of an underlying carrier leaf by a stained leaf lying thereabove. The stain stops are indicated at 14, and they alternate in the pack with the carrier leaves. The stain stops may be circular leaves similar in diameter to the carrier leaves. In the present instance the stop leaves are made of thin paper impermeable to the stain. Or they may be of paper impregnated or otherwise treated to serve the same purpose.

The numeral 15 indicates a holder for the assembled color chart 1 and pack of carrier leaves. In this embodiment the holder 15 is a sheet of relatively stiff paper, as cardboard, and the chart and carrier are held on the holder by the pin 12 which passes through the latter. The holder 15 is white in color and being relatively thick serves to restrict light being transmitted therethrough to the carrier leaves opposite the stain receiving margin 13 of the latter leaves. The several test colors may be marked with the percentages hereinbefore mentioned, as illustrated at 16.

In operation the observer applies the blood sample to the uppermost carrier leaf 3 at its margin 13 close alongside the edge 17 of the color chart. Thereupon he shifts the chart and stained carrier leaf relative to each other to bring the stain close to the several colors, the hæmoglobin content of the sample being indicated either exactly or approximately by the color with which it most closely agrees. The entire line of test colors is visible simultaneously with the stain when the chart is small, so that comparison is quickly and accurately effected. Transmitted light is largely cut off by underlying carrier leaves, their eliminating effect being augmented by the cardboard holder. Having used the upper carrier leaf, it is readily torn off, whereupon the apparatus is at once in condition for another test.

The test colors on the chart may be the same as those of the hæmoglobin scale devised by Tallquist, being various tones of red running from deep red or normal blood color through the lighter shades, as is well known.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. A hæmoglobin test apparatus having, in combination, a color chart and a stain carrier connected together and one shiftable relative to the other serially of the line of test colors on the chart, the carrier comprising a pack of relatively superposed detachable carrier leaves the topmost of which is retained in stain comparing relation during the serial shift between said carrier and chart.

2. A hæmoglobin test apparatus having, in combination, a pack of relatively superposed carrier leaves, a color chart superposed on said pack and lying within the outer margins of the leaves of said pack, the line of colors extending peripherally of the chart, said chart and leaves operatively connected within their edges for relative shift movement therebetween.

3. A hæmoglobin test apparatus having, in combination, a pack of relatively superposed carrier leaves, a color chart superposed on said pack and lying within the outer margins of the leaves of said pack, the line of colors extending peripherally of the chart, said chart and leaves operatively connected within their edges for relative rotative shift movement therebetween.

4. A hæmoglobin test apparatus having, in combination, a color chart and a stain carrier connected together and one shiftable relative to the other serially of the line of test colors on the chart, the carrier comprising a pack of detachable carrier leaves each of which is retained in stain comparing relation during the serial shift between said carrier and chart, and stain stops between said leaves.

5. A hæmoglobin test apparatus comprising, in combination, a pack of leaves and a color chart supported on, and so as to expose the upper leaf of said pack, and means so connecting said chart to said leaves that detachment of a leaf next said chart permits said chart to move into contact with the next underlying attached leaf of the pack.

6. A hæmoglobin test apparatus comprising, in combination, a pack of leaves and a color chart supported on, and so as to expose the upper leaf of said pack, and means so connecting said chart to said leaves that detachment of a leaf next said chart permits said chart to move into contact with the next underlying attached leaf of the pack, said pack comprising alternate stain carrier leaves and stain stop leaves.

7. A hæmoglobin test apparatus comprising, in combination, a stain carrier and a color chart superposed on said carrier and exposing its margin, said chart having a circular series of hæmoglobin test colors, said chart and carrier rotatively shiftable relative to each other, while maintaining color comparing relation to each other.

In testimony whereof I affix my signature.

ALFRED FEINBERG.